United States Patent
Shimizu et al.

(10) Patent No.: US 9,373,202 B2
(45) Date of Patent: Jun. 21, 2016

(54) VEHICLE INFORMATION RECORDING APPARATUS

(71) Applicant: DENSO CORPORATION, Kariya, Aichi-pref. (JP)

(72) Inventors: Nobuyoshi Shimizu, Okazaki (JP); Yasutoshi Katoh, Kakegawa (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 116 days.

(21) Appl. No.: 14/150,132

(22) Filed: Jan. 8, 2014

(65) Prior Publication Data

US 2014/0195070 A1 Jul. 10, 2014

(30) Foreign Application Priority Data

Jan. 10, 2013 (JP) .................................. 2013-002603

(51) Int. Cl.
| | |
|---|---|
| *G07C 5/08* | (2006.01) |
| *B60R 21/013* | (2006.01) |
| *B60R 21/0134* | (2006.01) |
| *B60R 21/0136* | (2006.01) |
| *B60W 30/095* | (2012.01) |
| *G01S 13/93* | (2006.01) |

(52) U.S. Cl.
CPC ............ *G07C 5/0841* (2013.01); *B60R 21/013* (2013.01); *B60R 21/0134* (2013.01); *B60R 21/0136* (2013.01); *B60W 30/095* (2013.01); *G07C 5/085* (2013.01); *G01S 13/93* (2013.01); *G01S 13/931* (2013.01); *G01S 2013/9371* (2013.01); *G01S 2013/9375* (2013.01); *G01S 2013/9378* (2013.01); *G01S 2013/9385* (2013.01); *G01S 2013/9389* (2013.01)

(58) Field of Classification Search
None
See application file for complete search history.

(56) References Cited

U.S. PATENT DOCUMENTS 5,815,093 A * 9/1998 Kikinis .......................... 340/937
5,936,549 A * 8/1999 Tsuchiya ....................... 340/903
(Continued)

FOREIGN PATENT DOCUMENTS

| JP | 07-132793 | 5/1995 |
|---|---|---|
| JP | 2003-261001 | 9/2003 |

(Continued)

OTHER PUBLICATIONS

Prakah-Asante WO 2012/171677 A1, Description (Machine Translation Nov. 6, 2015).*

(Continued)

*Primary Examiner* — Fadey Jabr
*Assistant Examiner* — Kevin P Mahne
(74) *Attorney, Agent, or Firm* — Harness, Dickey & Pierce, P.L.C.

(57) ABSTRACT

A vehicle information recording apparatus for a vehicle includes a collision determination section and an information management section. The collision determination section determines the presence or absence of a collision between the vehicle and an object based on (i) detection values of impact sensors which detect impacts applied to the vehicle and (ii) detection values by proximity sensors which detect an approach of the object to the vehicle. The information management section records collision data concerning the collision based on a determination result by the collision determination section. This enables a detection of a collision with an object as a recording target while reducing influence of vibration or noise.

11 Claims, 4 Drawing Sheets

(56) References Cited

U.S. PATENT DOCUMENTS

| | | | |
|---|---|---|---|
| 2003/0168839 A1 | 9/2003 | Miyoshi | |
| 2006/0052924 A1* | 3/2006 | Prakah-Asante | ... B60R 21/0134 701/45 |
| 2006/0113778 A1* | 6/2006 | Seikai | 280/735 |
| 2007/0106474 A1* | 5/2007 | Ide | 701/301 |
| 2007/0228705 A1* | 10/2007 | Rao et al. | 280/735 |
| 2008/0147267 A1* | 6/2008 | Plante et al. | 701/35 |
| 2008/0234890 A1* | 9/2008 | Okada et al. | 701/35 |
| 2009/0138160 A1* | 5/2009 | Iyoda | 701/45 |
| 2011/0057783 A1 | 3/2011 | Yagi et al. | |
| 2011/0125372 A1* | 5/2011 | Ito | 701/45 |
| 2012/0146766 A1* | 6/2012 | Geisler et al. | 340/8.1 |
| 2013/0181860 A1* | 7/2013 | Le et al. | 342/72 |
| 2014/0001738 A1* | 1/2014 | Ikuta et al. | 280/735 |
| 2014/0200773 A1* | 7/2014 | Wellhoefer | B60R 21/0134 701/45 |

FOREIGN PATENT DOCUMENTS

| | | | | |
|---|---|---|---|---|
| JP | 2006-195715 | 7/2006 | | |
| JP | 2009-230343 | 10/2009 | | |
| JP | 2010-003110 | 1/2010 | | |
| JP | 2012-190072 | 10/2012 | | |
| WO | WO 2008/026290 | 2/2008 | | |
| WO | WO2012/171677 A1 * | 12/2012 | ......... | B60R 21/0134 |

OTHER PUBLICATIONS

Prakah-Asante WO 2012/171677 A1, Claims (Machine Translation Nov. 6, 2015).*

Office Action dated Jan. 29, 2015 in corresponding Japanese Application No. 2013/002603.

* cited by examiner

| | ULTRA SENSOR No. | DETECT VALUE Vd | DETECT TIME | ACCEL SENSOR No. | DETECT VALUE Vg | DETECT TIME | POSITION INFO |
|---|---|---|---|---|---|---|---|
| ID-No.: | | START TIME OF USE: | | | | | |
| 1 | a, b, c | n1 | h:m:s | o, p, q | g1 | h:m:s | pos1 |
| 2 | a, b | n2 | h:m:s | o, p | g2 | h:m:s | pos2 |
| 3 | d, e, f | n3 | h:m:s | r, s, t | g3 | h:m:s | pos3 |
| ⋮ | ⋮ | ⋮ | ⋮ | ⋮ | ⋮ | ⋮ | ⋮ |
| N | | | | | | | |
| ID-No.: | | END TIME OF USE: | | | | | |

VEHICLE INFORMATION RECORDING APPARATUS

CROSS REFERENCE TO RELATED APPLICATION

The present application is based on Japanese Patent Application No. 2013-2603 filed on Jan. 10, 2013, the disclosure of which is incorporated herein by reference.

TECHNICAL FIELD

The present disclosure relates to a vehicle information recording apparatus that records a collision between an object and a vehicle.

BACKGROUND ART

[Patent Literature 1] JP 2006-195715 A

A vehicle information recording apparatus is conventionally proposed which detects a collision between an object and a vehicle and records the collision data related to the collision. For example, Patent Literature 1 discloses a configuration to detect an impact applied to the vehicle with an acceleration sensor and record the collision data, which specifies the user of the vehicle and some image data at the collision. Such a vehicle information recording apparatus is to compare a detection value by an impact sensor such as an acceleration sensor with a threshold value predetermined, thereby determining the presence or absence of a collision between an object and a vehicle.

Incidentally, in order to detect certainly a collision whose data is to be recorded as a recording target, the detection value resulting from the collision needs to exceed the above threshold value; thus, the threshold value needs to be designated to be lower to some extent. However, designating the threshold value to be lower may result in detecting a vibration or noise during the traveling of the vehicle, possibly recording some unnecessary collision data. This eventually requires a process to extract some necessary collision data from many recorded collision data, further possibly increasing a load of an internal memory due to the increase in the recording target.

SUMMARY

The present disclosure is made in consideration of such a situation. It is an object of the present disclosure to provide a vehicle information recording apparatus to accurately detect a collision serving as a recording target while reducing influence of vibration or noise.

To achieve the above object, according to an example of the present disclosure, a vehicle information recording apparatus for a vehicle is provided to include a collision determination section and an information management section. The collision determination section is to determine presence or absence of a collision of an object with the vehicle based on a detection value of an impact sensor that detects an impact applied to the vehicle and a detection value of a proximity sensor that detects an approach of the object to the vehicle. The information management section is to record collision data concerning the collision based on a determination result by the collision determination section.

This configuration permits the collision determination section to determine presence or absence of a collision of an object to the vehicle using the respective detection values of the impact sensor and the proximity sensor. This enables the distinction between a noise and a collision of an object to a vehicle based on an approach state of the object even if an impact applied to the vehicle is detected. The vehicle information recording apparatus can thus designate the threshold value to be low as compared with a conventional one, for instance. This enables a certain detection of a collision serving as a recording target while reducing influence of vibration or noise.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

The following explains a vehicle information recording apparatus according to an embodiment of the present disclosure with reference to drawings. This vehicle information recording apparatus mounted to a vehicle is to record collision data related to a collision between a vehicle and an object, and is exemplified as an airbag ECU (Electronic Control Unit) that controls an actuation of an airbag apparatus serving as an occupant protection apparatus of the vehicle.

<Embodiment>

Figure 1:
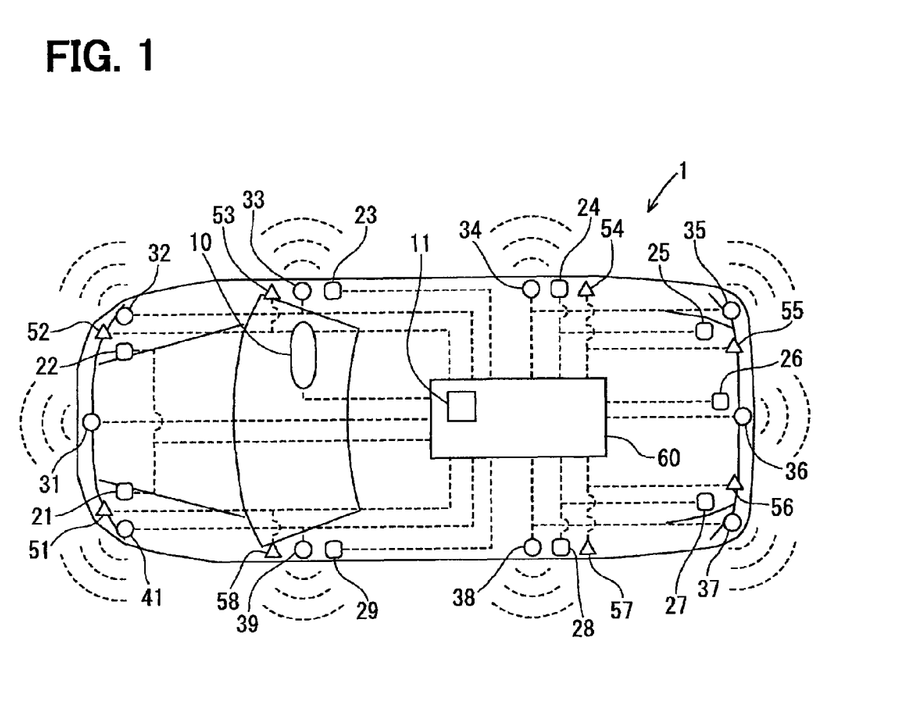
FIG. 1 is a diagram illustrating an overall configuration of a vehicle information recording apparatus according to an embodiment of the present disclosure.

With reference to FIG. 1, a vehicle 1 includes an airbag apparatus 10, a plurality of acceleration sensors 21 to 29, a plurality of ultrasonic sensors (31 to 39, and 41), a plurality of bumper sensors (51 to 58), and an airbag ECU 60. Here, the vehicle 1 may be also referred to as a host vehicle that is mounted with the airbag ECU 60. The airbag apparatus 10 is an occupant protection apparatus that protects an occupant of the vehicle 1 when a collision with an obstacle etc. occurs during a travel of the vehicle 1. This airbag apparatus 10 is driven or actuated by a drive circuit 11 included in the airbag ECU 60. The drive circuit 11 is to inflate an airbag (unshown) by igniting an inflator of the airbag apparatus 10 based on a result of a collision determination by a collision determination section 61 that is to be mentioned later.

The acceleration sensors 21 to 29 are impact sensors which detect impacts applied to the vehicle 1. The impact sensor may be one of the various types of sensors; the present embodiment uses an acceleration sensor which detects an acceleration in a predetermined direction. As illustrated in FIG. 1, the nine acceleration sensors 21 to 29 in all are disposed in the vehicle 1 as follows: two (21, 22) at respective two places in front portions, two (23, 24) at respective two places in the right-side portions, three (25, 26, 27) at respective three places in rear portions, and two (28, 29) at respective two places in left-side portions. In addition, the acceleration sensors 21 to 29 are connected communicatively with the airbag ECU 60 via a communication bus. For example, the acceleration sensor 21 to 29 uses a change of an electrostatic capacity accompanying the displacement of a polar plate due to the change of the acceleration in a detection direction, thereby outputting a detection value according to the acceleration to the airbag ECU 60.

The ultrasonic sensors 31 to 39, 41 are proximity sensors which detect approaches of objects to the vehicle 1. The proximity sensor may be one of the various types of sensors; the present embodiment uses an ultrasonic sensor of reflection type which detects the presence or absence of an object or a distance to an object by transmitting and receiving ultrasonic waves. As illustrated in FIG. 1, the ten ultrasonic sensors 31 to 39, 41 in total are disposed in the vehicle 1 as follows: three (31, 32, 41) at respective three places in front portions, two (33, 34) at respective two places in the right-side portions, three (35, 36, 37) at respective three places in rear portions, and two (38, 39) at respective two places in left-side portions. In addition, the ultrasonic sensors 31 to 39, 41 are connected communicatively with the airbag ECU 60 via a communication bus. For instance, the ultrasonic sensor 31 to 39, 41 outputs a detection value according to a distance to an object to the airbag ECU 60 using an arrival time of reflected waves when the object approaches the vehicle 1 closely.

The bumper sensor 51 to 58 detects a deformation of the bumper of the vehicle 1 when the vehicle 1 collides with an object. The bumper sensor 51 to 58 uses a pressure sensor that detects an internal pressure which changes in connection with the deformation of the bumper. With reference to FIG. 1, the eight bumper sensors 51 to 58 in total are disposed in the vehicle 1 as follows: two (51, 52) at respective two places in front portions; two (53, 54) at respective two places in the right-side portions, two (55, 56) at respective two places in rear portions, and two (57, 58) at respective two places in left-side portions. In addition, the bumper sensors 51 to 58 are connected communicatively with the airbag ECU 60 via a communication bus. The detection value of the bumper sensor 51 to 58 is used for determination at to whether a collision object is a pedestrian, for example. When the acceleration sensor 21 to 29 detects an impact, the airbag ECU 60 determines the necessity or unnecessity to actuate a pedestrian protection apparatus (unshown) based on a result of the determination.

The airbag ECU 60 is a control unit which records various kinds of collisions in the vehicle while actuating the airbag apparatus 10 and the pedestrian protection apparatus depending on the types of collisions. This airbag ECU 60, as mentioned above, is connected communicatively to the various sensors, which include the acceleration sensors 21 to 29, the ultrasonic sensors 31 to 39, 41, the bumper sensors 51 to 58, and a speed sensor (unshown), via the communication bus, thereby receiving detection values of the various sensors. In addition, the airbag ECU 60 is connected with the airbag apparatus 10 and the pedestrian protection apparatus or the like to ignite an inflator of each protection apparatus. The present embodiment has a configuration where the airbag ECU 60 is supplied with electric power from an in-vehicle battery when the ignition switch of the vehicle 1 is in the ON state.

Figure 2:
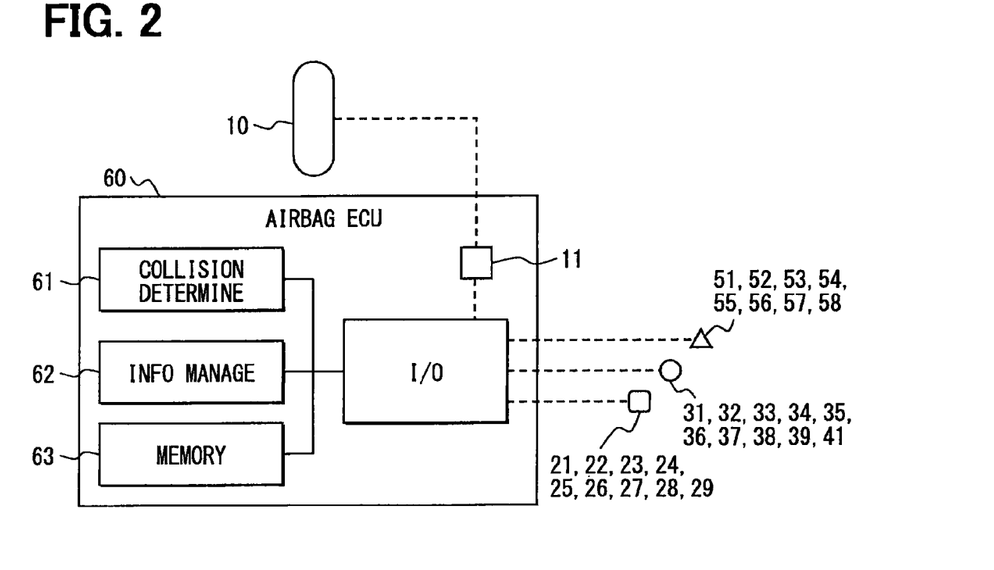
FIG. 2 is a block diagram illustrating a hardware configuration of the vehicle information recording apparatus.

With reference to FIG. 2, the airbag ECU 60 includes a collision determination section 61, an information management section 62, and an internal memory 63. The collision determination section 61 determines the presence or absence of a collision to the vehicle 1 based on the detection values of the acceleration sensors 21 to 29 and the detection values of the ultrasonic sensors 31 to 39, 41. To be specific, the collision determination section 61 determines whether an impact applied to the vehicle 1 is due to a collision that requires an actuation of the airbag apparatus 10 or whether the impact is due to a collision that requires the recording of collision data, based on each criterion of determination when the detection value is inputted from the acceleration sensor 21 to 29. When determining at least that the impact is due to the collision requiring the recording of collision data, the collision determination section 61 determines that a collision of an object to the vehicle 1 has occurred.

Figure 3:
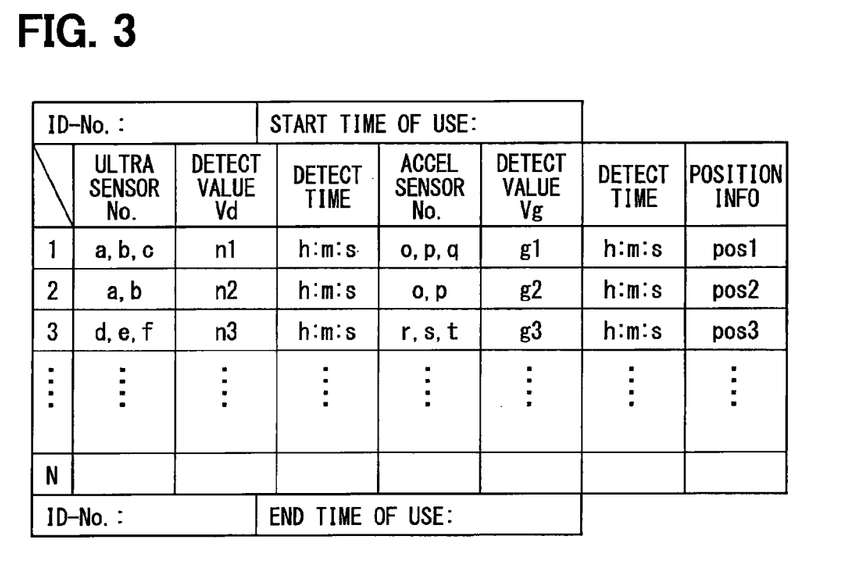
FIG. 3 is a diagram illustrating a format of collision data.

The collision data signify various data related to a collision. For instance, as shown in FIG. 3, the collision data include: the sensor information of the ultrasonic sensors 31 to 39, 41 such as a sensor number (NO), a detection value, a detection time; the sensor information of the accelerator sensors 21 to 29 such as a sensor number (NO), a detection value, a detection time; and the position information on collision. In addition, the collision data include or record the number of individual ID for specifying a user of the vehicle 1, and a start time and an end time of use of the vehicle 1 by the user. The present embodiment has a configuration where when determining that an impact has been applied to the vehicle 1, the collision determination section 61 deduces an impact spot in the vehicle 1 and an approach spot of an object based on the detection values of the acceleration sensors 21 to 29 and the detection values of the ultrasonic sensors 31 to 39, 41, thereby determining the presence or absence of a collision. The details of the various processes of the airbag ECU 60 containing the collision determination section 61 will be mentioned later.

The information management section 62 records the collision data in the internal memory 63 based on the determination result by the collision determination section 61. In addition, in the present embodiment, the information management section 62 records the position information on the approach spot deduced by the collision determination section 61 in addition to the collision data; the position information is on the position at which the object approaches the vehicle 1 most closely. The internal memory 63 includes an EEPROM or flash memory to record or store the programs of the various processes executed by the airbag ECU 60 and threshold values which are used for determinations. In addition, the internal memory 63 securely includes a storage area as EDR (Event Data Recorder), so that a predetermined amount of collision data may be recorded in order from the newest one.

(Control Process of Airbag ECU)

The following explains a basic control process of the airbag ECU 60. When an impact is applied to the vehicle 1 to cause at least one of the acceleration sensors 21 to 29 to detect the impact, the detection value Vg is inputted to the airbag ECU 60. This permits the airbag ECU 60 to call for the program which executes the process indicated in FIG. 4 to execute a control process such as actuation of the airbag apparatus 10, recording of vehicle information. It is further noted that a flowchart in the present application includes sections (also referred to as steps), which are represented, for instance, as S11. Further, each section can be divided into several sections while several sections can be combined into a single section. Furthermore, each of thus configured sections can be referred to as a module, device, or means and achieved not only (i) as a software section in combination with a hardware unit (e.g., computer), but also (ii) as a hardware section (e.g., integrated circuit, hard-wired logic circuit), including or not including a function of a related apparatus. Further, the hardware section may be inside of a microcomputer.

Figure 4:
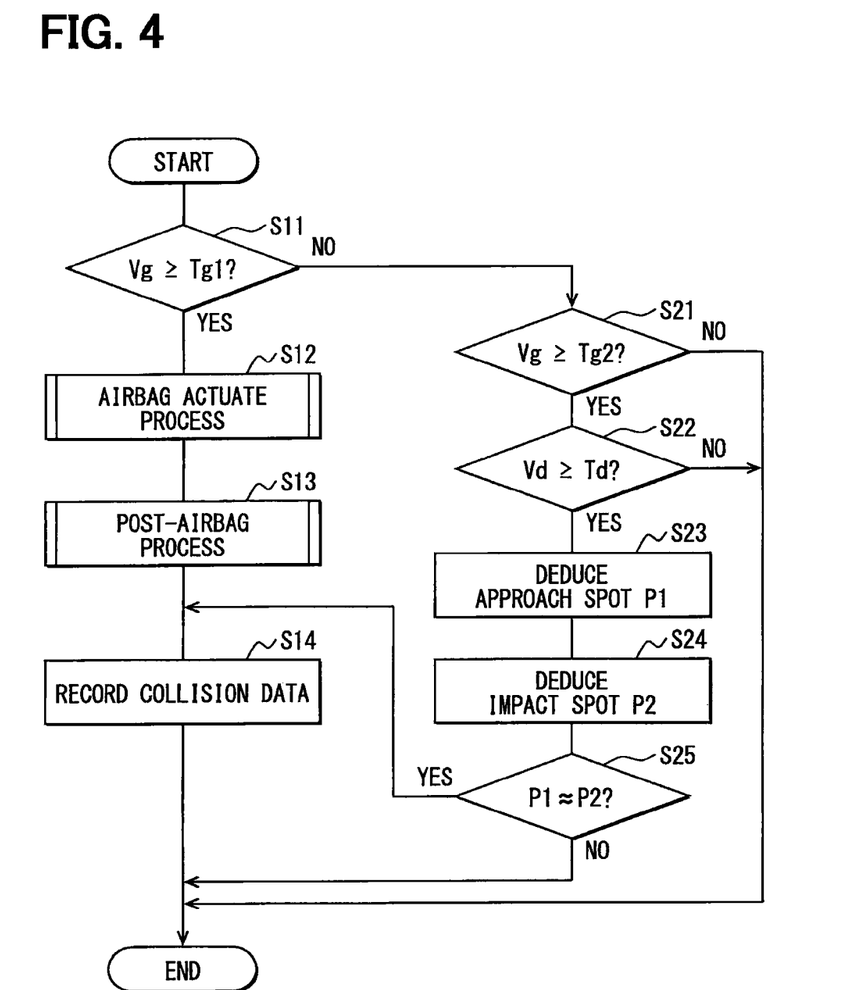
FIG. 4 is a flowchart diagram illustrating a control process by an airbag ECU.

First, the collision determination section 61 acquires a detection value Vg by each acceleration sensor 21 to 29 inputted into the airbag ECU 60, and compares the detection value Vg with a threshold value Tg1, which is one of the criteria of determinations as to whether to actuate the airbag apparatus 10 (S11). When the detection value Vg is equal to or greater than a threshold value Tg1 (Vg≥Tg1) (S11: Yes), the collision determination section 61 determines (i.e., concludes) that a heavy collision occurred regardless of the detection value Vd of each ultrasonic sensor 31 to 39, 41; the heavy collision signifies a collision needing an actuation of the airbag apparatus 10. To be specific, the detection value Vg of the heavy collision is a value indicated with a curve line Lg1 in FIG. 5. The collision determination section 61 determines that the heavy collision occurred at the time T1 when the detection value Vg exceeded the threshold value Tg1.

In order to make explanation simple, it is assumed that whether the collision is a heavy collision is determined based on the detection value Vg by each acceleration sensor 21 to 29. In fact, the collision determination section 61 considers detection values by other sensors such as a speed sensor and a sitting sensor, thereby determining the actuation of the airbag apparatus 10 comprehensively; this helps prevent an incorrect actuation or a malfunction of the airbag apparatus 10. It is noted that, as mentioned above, the collision determination section 61 does not use any detection values Vd of the ultrasonic sensors 31 to 39, 41 for determining the actuation of the airbag apparatus 10. When the impact is greater than a certain level, it is naturally expected that the vehicle 1 contacts an object; thus, the number of times of determinations are desirably reduced to speed up of actuating the airbag apparatus 10.

Then, the airbag ECU 60 advances to an actuation process of the airbag apparatus (S12). To be specific, the airbag ECU 60 outputs a control signal to the drive circuit 11 based on the determination result of the collision by the collision determination section 61 to permit the drive circuit 11 to ignite the inflator of the airbag apparatus 10 to inflate the airbag. At this time, the airbag ECU 60 may be provided to execute an actuation process of the pedestrian protection apparatus in parallel to the actuation process of the airbag apparatus 10. In such a case, the airbag ECU 60 retrieves detection values by the bumper sensors 51 to 58 to perform a determination as to whether the collision object is a pedestrian, and actuates the pedestrian protection apparatus based on a result of such determination.

Then, the airbag ECU 60 advances to a post-airbag actuation process (S13) that is a process performed after the actuation process of the airbag apparatus. For instance, the post-airbag actuation process includes lighting of a warning lamp to indicate the actuation of the airbag. Furthermore, the information management section 62 records or stores the collision data in the internal memory 63 (S14); the collision data include (i) the sensor information of the accelerator sensor 21 to 29 that detects the impact among the accelerator sensors 21 to 29, such as a sensor number (No), a detection value (Vg), and a detection time, and (ii) output history information which indicates a history of outputs of control signals to the airbag apparatus 10. Then, the airbag ECU 60 ends the present control process.

Figure 5:
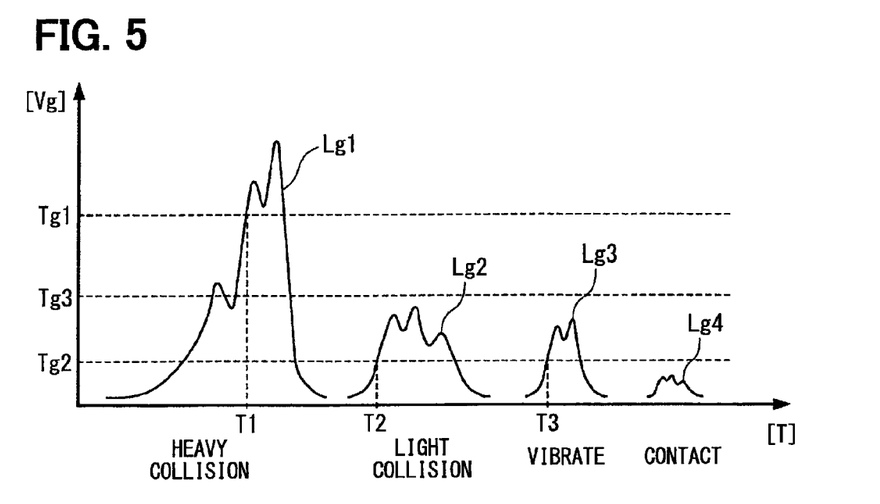
FIG. 5 is a diagram illustrating relations between various collisions and detection values of an impact sensor.

In contrast, at the determination as to whether the collision is a heavy collision at S11, when the detection value Vg is less than the threshold value Tg1 (Vg<Tg1) (S11: No), the following takes place. That is, the collision determination section 61 compares the detection value Vg with a threshold value Tg2 that is one of the criteria of determinations as to whether to record the collision data (S21). The detection value Vg in this case (S11: No) is one of the values indicated with curve lines Lg2 to Lg4 in FIG. 5, for example. As illustrated in FIG. 5, the threshold value Tg2 is designated to be smaller than the threshold value Tg1 that is the criterion of determination as to whether to actuate the airbag apparatus 10 (Tg1>Tg2). The collision determination section 61 determines that a recording-necessary collision occurred at the time T2, T3 when the detection value Vg exceeded the threshold value Tg2; although the recording-necessary collision is other than the heavy collision, the recording-necessary collision requires the recording thereof.

When the detection value Vg is equal to or greater than the threshold value Tg2 (Vg≥Tg2) (S21: Yes), the collision determination section 61 acquires a detection value Vd by each ultrasonic sensors 31 to 39, 41 inputted into the airbag ECU 60, and compares the detection value Vd with a threshold value Td that is one of the criteria of determinations as to whether to record the collision data (S22). When the detection value Vd is equal to or greater than the threshold value Td (Vd≥Td) (S22: Yes), the collision determination section 61 advances to S23. The detection value Vd in this case is one of the values indicated with curve lines Ld2, Ld4 in FIG. 6, for example. The collision determination section 61 determines that a close approach to the vehicle 1 occurred at the time T4, T5 when the detection value Vd exceeded the threshold value Td.

Then, the collision determination section 61 then deduces an approach spot P1 of the object in the vehicle 1 (S23). To be specific, the collision determination section 61 first acquires respective detection values Vd by the ultrasonic sensors 31 to 39, 41 inputted into the airbag ECU 60. Next, the collision determination section 61 identifies one or more than one ultrasonic sensor that detects an approach of the object due to exhibit a detection value Vd being equal to or greater than the threshold value Td among the ultrasonic sensors 31 to 39, 41. Then, the collision determination section 61 deduces the approach spot P1 of the object in the vehicle 1 based on the installed position of the identified ultrasonic sensor and the magnitude of its detection value Vd.

Further, the collision determination section 61 deduces an impact spot P2 in the vehicle 1 (S24); the impact spot P2 is a spot at which an impact is applied to the vehicle 1. To be specific, the collision determination section 61 first acquires the respective detection values Vg by the acceleration sensors 21 to 29 inputted into the airbag ECU 60. Next, the collision determination section 61 identifies one or more than one acceleration sensor that detects an impact applied to the vehicle 1 to exhibit a detection value Vd being equal to or greater than the threshold value Tg2 among the acceleration sensors 21 to 29. Then, the collision determination section 61 deduces the impact spot P2 in the vehicle 1 based on the installed position of the identified acceleration sensor and the magnitude of its detection value Vg.

The collision determination section 61 determines the presence or absence of a collision of the object to the vehicle 1 based on the deduced approach spot P1 and the deduced impact spot P2 (S25). The collision of the object includes, in addition to the above-mentioned heavy collision, a recording-necessary collision or a light collision, which does not require any actuation of the airbag apparatus 10 or the pedestrian protection apparatus but requires the recording thereof as vehicle information. That is, at S25, the collision determination section 61 determines whether the impact that is not determined to be a heavy collision at S11 is (i) a light collision or (ii) noise or any contact other than the heavy collision or light collision. In addition, the collision determination section 61 gives a precedence or priority to the determination (S11) of the actuation of the airbag apparatus 10 in the present control process; this is due to the purpose of promptly actuating a safety apparatus such as the airbag apparatus 10 in the case of the heavy collision.

In addition, the determination at S25 is made based on whether the deduced approach spot P1 matches the deduced impact spot P2. Either matching or not matching may be determined from a ratio of overlap between the range of the approach spot P1 and the range of the impact spot P2, for example. As explained above, the presence or absence of a light collision is determined based on the approach spot P1 and the impact spot P2 deduced from the detection values Vd, Vg of the mutually different sensors; thereby, the detected impact can be certainly identified to be distinguished between (i) a light collision and (ii) a vibration or noise during the travel of the vehicle 1.

When the approach spot P1 matches the impact spot P2 (S25: Yes), the collision determination section 61 determines that a light collision occurred in the vehicle 1. Then, based on this determination result, the information management section 62 stores or records the collision data in the internal memory 63 (S14); the collision data include (i) the sensor information of the acceleration sensor that detected the impact among all the acceleration sensors 21 to 29, (ii) the sensor information of the ultrasonic sensor that detected the impact among all the ultrasonic sensors 31 to 39, 41 such as a sensor number (No), a detection value (Vd), and a detection time). This collision data further include the position information on the approach spot P1 (i.e., the information related to the spot or position at which the vehicle 1 and the object collided.

Figure 6:
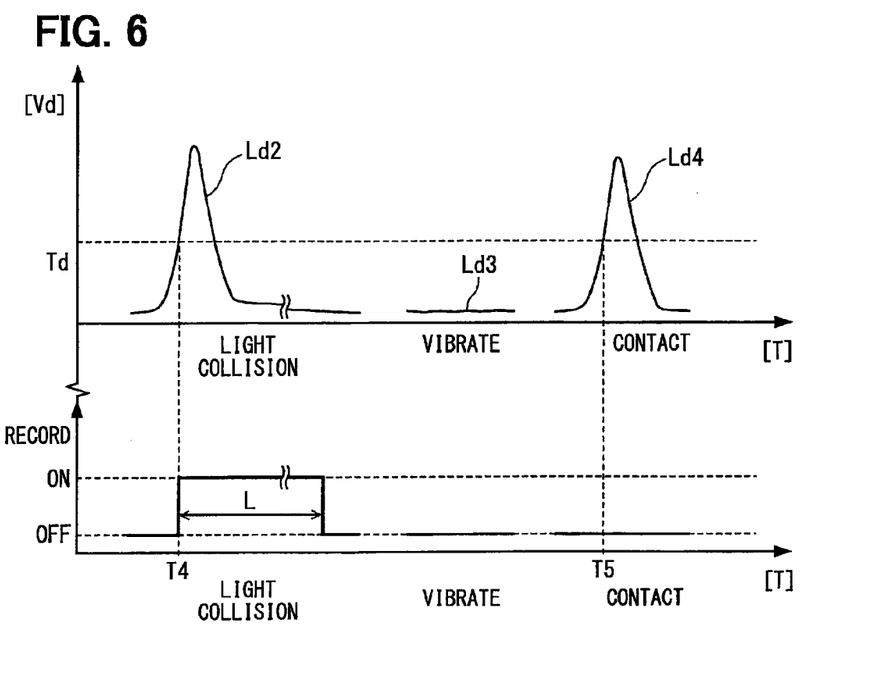
FIG. 6 is a diagram illustrating relations between various collisions and detection values of a proximity sensor and a relevant timing chart that indicates the ON/OFF states of the recording in an information management section.

To be specific, the light collision is determined when the detection value Vg related to impact is a value indicated with a curve line Lg2 in FIG. 5 and, simultaneously, the detection value Vd related to approach is a value indicated with a curve line Ld2 in FIG. 6. With reference to FIG. 6, the information management section 62 maintains the recording in the ON state for a predetermined time period L since the time T4 when the detection value Vd related to approach exceeds the threshold value Td, and thereby records the detection values Vd continuously detected for the predetermined time period L as the sensor information mentioned above. In addition, the information management section 62 may buffer the detection values Vd and record the detection values detected after the time T4 in the internal memory 63 when the collision determination section 61 determines that a light collision occurred. In addition, a similar process may be applied to the sensor information of the acceleration sensors 21 to 29; the detailed explanation is omitted. Then, the airbag ECU 60 ends the present control process.

In contrast, when the approach spot P1 does not match the impact spot P2 (S25: No), the collision determination section 61 performs as follows. That is, the collision determination section 61 supposes that the event of the impact applied to the vehicle 1 is different from the event of the approach of the object to the vehicle 1, thereby determining that a light collision did not occur in the vehicle 1. Now, suppose a case where the detection values Vg, Vd equivalent to a light collision (e.g., Lg2 in FIG. 5, Ld2 in FIG. 6) are detected simultaneously. In such a case, the collision determination section 61 determines whether these events are identical based on the deduced spots P1 and P2. Thereby the collision determination section 61 can improve an accuracy of the determination as to whether a light collision occurred in the vehicle 1.

In contrast, when the detection values Vg by the acceleration sensors 21 to 29 are less than the threshold value Tg2 (Vg<Tg2) (S21: No), the following takes place. The collision determination section 61 supposes that (i) a minor impact occurred in the vehicle 1 due to (a) a contact with an object or (b) vibration during the travel or (ii) a noise occurred in the vehicle 1. To be specific, the contact or the like is determined when the detection value Vg related to impact is a value indicated with a curve line Lg4 in FIG. 5. Therefore, even if an approach of an object causes the detection value Vd related to approach to exceed the threshold value Td at the time T5 as indicated with a curve line Ld4 in FIG. 6, the collision determination section 61 determines that any collision did not occur in the vehicle 1. Therefore, the information management section 62 maintains the recording state in the OFF state.

In addition, when the detection values Vd by the ultrasonic sensors 31 to 39, and 41 are less than the threshold value Td (Vd<Td) (S22: No), the collision determination section 61 determines as follows. That is, since a certain amount of impact is applied to the vehicle 1 but an approach of an object is not detected, the collision determination section 61 determines that a vibration or the like during the travel occurs in the vehicle 1 while supposing that the impact is not a collision with the vehicle 1. To be specific, the vibration or the like is determined when the detection value Vd related to approach is a value indicated with a curve line Ld3 in FIG. 6. Therefore, even if the detection value Vg related to impact exceeds the threshold value Tg2 at the time T3 as indicated with a curve line Lg3 in FIG. 5, the collision determination section 61 determines that any collision did not occur in the vehicle 1. Therefore, the information management section 62 maintains the recording state in the OFF state, as indicated in FIG. 6.

Thus, when the collision determination section 61 does not determine that a light collision did not occur (S21, S22, S25: No), the airbag ECU 60 ends the present control process without recording any collision data using the information management section 62. In contrast, when the collision determination section 61 determines that a heavy collision or a light collision occurred (S11, S25: Yes), the airbag ECU 60 is configured to record the collision data using the information management section 62 (514), as mentioned above.

(Advantageous Effects)

The airbag ECU 60 serving as a vehicle information recording apparatus according to the present embodiment is configured as follows. The collision determination section 61 is to determine the presence or absence of a collision of an object to the vehicle 1 using detection values Vg of the acceleration sensors 21 to 29, and the detection values Vd of the ultrasonic sensors 31 to 39, 41 (S21, S22). This configuration can distinguish a heavy collision or a light collision, or a noise or a vibration during travel of the vehicle 1 when an impact applied to the vehicle 1 is detected.

Here, when the collision determination section 61 determines that a heavy collision or a light collision occurred in the vehicle 1 (S11, S25: Yes), the airbag ECU 60 is configured to record the collision data related to the collision using the information management section 62 (S14). Like in a conventional case, a light collision applying an impact to a vehicle may need to be recorded even in a case other than the case of actuating an occupant protection apparatus. Conventionally, in order to prevent a mistake that noise or vibration during travel of a vehicle is determined to be a light collision, the threshold value Tg3, which is a criterion of determination of whether to record (i) a detection value Vg related to impact and (ii) collision data, is sometimes designated to be higher than a maximum value of a curve line Lg3 of the detection value Vg due to vibration.

In contrast, the airbag ECU 60 of the present embodiment is configured to determine whether a light collision occurred in the vehicle 1 using both the detection values Vg related to impact and the detection values Vd related to approach (S21, S22). This configuration can designate the threshold value Tg2, which is a criterion of determination of whether to record collision data, to be lower than the maximum value of the curve line Lg3 of the detection value Vg related to vibration or the like. Under such a configuration, the detection value Vd related to approach indicated in the curve line Ld3 does not exceed the threshold value Td even if the detection value Vg related to vibration etc. exceeds the threshold value Tg2. This can prevent a mistake that a vibration etc. is determined to be a light collision. Thus, the threshold value Tg2 can be designated to be low as compared with a conventional case; a light collision being a recording target can be certainly detected while the influence of noise can be reduced. In addition, the collision determination section 61 is configured to determine that a collision occurred regardless of the detection values of the ultrasonic sensors 31 to 39, 41 when the detection value Vg related to impact is equal to or greater than the threshold value Tg1 to actuate the airbag apparatus 10 (S11: Yes). This configuration permits the airbag ECU 60 to disuse the detection values Vd related to approach in the case of a heavy collision to thereby reduce the number of times of determinations by a portion of the determination of whether an object approaches while reducing a processing load.

In addition, the collision determination section 61 is configured to deduce an approach spot P1 of an object in the vehicle 1 based on the installed position of the ultrasonic sensor which detects an approach of the object among all the ultrasonic sensors 31 to 39, 41 (S23). Further, when it is determined that a light collision occurred in the vehicle 1, the above position information on the approach spot P1 is further recorded in addition to the collision data using the information management section 62. This configuration can use the position information included in collision data for various verifications such as specifying the cause of damage of the vehicle 1, for example.

In addition, the collision determination section 61 is configured to deduce an impact spot P2 in the vehicle 1 based on the installed position of the acceleration sensor which detects an impact among all the acceleration sensors 21 to 29 (S24). Further, the collision determination section 61 is configured to determine the presence or absence of a collision based on the approach spot P1 and the impact spot P2 (S25). This configuration enables a more accurate determination of the presence or absence of a light collision based on the correlation between the event that an object approaches the vehicle 1 closely, and the event that an impact is applied to the vehicle 1. This reduces the influence by the noise or vibration during the travel of the vehicle 1 while improving the accuracy of collision determination.

<Modifications>

The present disclosure is not limited to the above mentioned embodiment at all. It can be achieved in various manners within a scope not departing from the present disclosure. For instance, in the above embodiment, when determining whether the detected impact depends on a light collision, the collision determination section 61 compares the detection value Vd related to approach with the threshold value Td that is one of the criteria of determinations as to whether to record the collision data at S22. In contrast, the collision determination section 61 may calculate at least one of (i) a distance of the object to the vehicle 1 or (ii) an approach speed of the object to the vehicle 1, using the detection values Vd; then, based on the calculation result, the presence of absence of a collision may be determined. For example, the distance between the object and the outside surface of the vehicle 1 may be calculated based on the detection values Vd of the mutually adjoining ultrasonic sensors among all the ultrasonic sensors 31 to 39, 41. In addition, the collision determination section 61 may calculate an approach speed including an acceleration of an object to the vehicle 1 using the detection values Vd; then, the calculation result may be used for a control process of determining or expecting a collision of the object to the vehicle.

In addition, the vehicle 1 is configured to include a plurality of acceleration sensors 21 to 29 as an impact sensor which detects an impact and a plurality of ultrasonic sensors 31 to 39, 41 as a proximity sensor which detects an approach of an object. Without need to be limited to the acceleration sensor, the impact sensor may be a pressure sensor to detect an internal pressure which changes according to a deformation of a vehicle exterior due to an impact or a contact sensor to detect a deformation of a member. Without need to be limited to the ultrasonic sensor, the proximity sensor may be a millimeter wave sensor using electromagnetic waves or an LED sensor using reflected light. Furthermore, the proximity sensor may be configured to include a camera to capture an image of a vicinity of a vehicle, and an image processing section to perform image processing to image data obtained by the camera to thereby acquire a state of an approach of an object to the vehicle.

In addition, when the various sensors are used as the impact sensor or the proximity sensor, the vehicle information recording apparatus may amend detection values depending on characteristics of the various sensors. For example, the ultrasonic sensor of reflection type exemplified in the above embodiment has a long measurement distance with an advantageous effect having few restrictions of objects as a detection target while tending to receive comparatively easily the influence of wind or temperature. To that end, the distance with an object calculated from the detection value Vd of the ultrasonic sensor may be amended based on the information such as a vehicle speed, an outside air temperature. This can improve an accuracy of collision determination.

In the above embodiment, the vehicle information recording appartus is applied to the airbag ECU 60 which controls actuation of the airbag apparatus 10, for instance. Thus, when the ignition switch of the vehicle 1 is in the ON state, the vehicle information recording apparatus is supplied with electric power from the in-vehicle battery to permit the determination of the presence or absence of a collision and the recording of the collision data. In contrast, the vehicle information recording apparatus may be provided to be an independent body separate from the body of an airbag ECU 60. In addition, the vehicle information recording apparatus may be provided to be supplied with electric power via a power feeding line different from that to the airbag ECU 60. For example, the vehicle information recording apparatus may be supplied with electric power even when the ignition switch is in the OFF state, like an apparatus for security; this configuration can record a collision with an object that may cause a damage to an external of the vehicle even under a parked state.

In addition, the collision determination section 61 is to compare the detection values Vg and Vd with the threshold values Tg2 and Td predetermined at S21 and S22, respectively. In this regard, however, the collision determination section 61 only needs to determine the presence or absence of a collision based on the detection values Vg and Vd. For example, the threshold value Tg2 related to impact may be varied depending on the magnitude of the detection value Vd related to approach. That is, suppose a case where it is determined that an object contacts a vehicle since the detection value Vd by the proximity sensor is large enough. In such a case, even when the detection value Vg by the impact sensor is very small, the recording may be performed.

In the above embodiment, when determining the presence or absence of a light collision, the collision determination section 61 is configured to compare the approach spot P1 with the impact spot P2 (S25). In contrast, for the purpose of reducing a processing load of the airbag ECU 60, the comparison between the spots P1 and P2 may be omitted as needed. In this regard, however, from the viewpoint of reducing the influence of noise or vibration during travel of the vehicle, the configuration recited in the above embodiment may be suitable. Further, the determination is made as to whether the event that an impact is applied to the vehicle 1 matches the event that an object approaches the vehicle closely. This determination may be differently made by simply determining whether the detection times of respective detection value Vg, Vd are within a predetermined range, for instance.

In addition, the information management section 62 is to record the collision data in the internal memory 63 of the airbag ECU 60. In contrast, the information management section 62 may store the collision data in (i) another storage media communicatively connected in the vehicle such as an in vehicle ECU or dedicated memory or (ii) an information center separate from the vehicle.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A vehicle information recording apparatus for a vehicle, the vehicle including a plurality of impact sensors each detecting an impact applied to the vehicle and a plurality of proximity sensors each detecting an approach of an object to the vehicle,
the vehicle information recording apparatus comprising:
a collision determination section to perform a determination of either presence or absence of a collision of an object with the vehicle based on detection values of the impact sensors and detection values of the proximity sensors; and
an information management section to record collision data related to the collision based on a result of the determination performed by the collision determination section,
wherein
the collision determination section
deduces (i) an approach spot in the vehicle based on an installed position of a proximity sensor that detects an approach of the object among the proximity sensors, and (ii) an impact spot in the vehicle based on an installed position of an impact sensor that detects an impact applied to the vehicle among the impact sensors, and
settles the determination of the presence of the collision of the object with the vehicle when the deduced approach spot and the deduced impact spot are determined to match with each other, wherein
the deduced approach spot and the deduced impact spot are determined to match with each other based on a predetermined ratio of overlap between a range of the deduced approach spot and a range of the deduced impact spot.

2. The vehicle information recording apparatus according to claim 1, wherein:
the vehicle includes an occupant protection apparatus that protects an occupant of the vehicle at the collision; and
the collision determination section performs the determination of either the presence or the absence of the collision based on the detection value of the proximity sensor when the detection value of the impact sensor that detects the impact is less than a threshold value that actuates the occupant protection apparatus, whereas
the collision determination section settles the determination of the presence of the collision regardless of the detection values of the proximity sensors when the detection value of the impact sensor that detects the impact is not less than the threshold value that actuates the occupant protection apparatus.

3. The vehicle information recording apparatus according to claim 1, wherein
the information management section further records position information on the approach spot in addition to the collision data when the collision determination section settles the determination of the presence of the collision of the object with the vehicle.

4. The vehicle information recording apparatus according to claim 1, wherein
the collision determination section calculates at least one of (i) a distance of the object to the vehicle or (ii) an approach speed of the object to the vehicle, using the detection value of the proximity sensor.

5. The vehicle information recording apparatus according to claim 1, wherein:
the plurality of proximity sensors are separately disposed at a front portion, a left portion, a rear portion, and a right portion of the vehicle to detect an object in an area surrounding the vehicle; and
the plurality of impact sensors are separately disposed at a front portion, a left portion, a rear portion, and a right portion of the vehicle to detect an impact applied from the area surrounding the vehicle to the vehicle.

6. The vehicle information recording apparatus according to claim 1, wherein:
the vehicle includes an occupant protection apparatus that protects an occupant of the vehicle at the collision, the occupant protection apparatus being activated when the detection value of the impact sensor is equal to or greater than a threshold value;
when the detection value of the impact sensor is equal to or greater than the threshold value,
the collision determination section settles the determination of the presence of the collision based on only the detection value of the impact sensor, without further deducing the approach spot or the impact spot based on the detection values of the proximity sensors as well as the detection value of the impact sensor that detects the impact; and
when the detection value of the impact sensor that detects the impact is less than the threshold value,
the collision determination section settles the determination of the presence of the collision of the object with the vehicle by deducing the approach spot and the impact spot and then determining that the approach spot and the impact spot match with each other.

7. A vehicle information recording apparatus for a vehicle,
the vehicle including a plurality of impact sensors each detecting an impact applied to the vehicle and a plurality of proximity sensors each detecting an approach of an object of the vehicle,
the vehicle information recording apparatus comprising:
a collision determination section to perform a determination of either presence or absence of a collision of an object with the vehicle based on detection values of the impact sensors and detection values of the proximity sensors; and
an information management section to record collision data related to the collision based on a result of the determination performed by the collision determination section,
wherein
the collision determination section deduces (i) an approach spot in the vehicle based on an installed position of a proximity sensor that detects an approach of the object among the proximity sensors, and (ii) an impact spot in the vehicle based on an installed position of an impact sensor that detects an impact applied to the vehicle among the impact sensors, and
settles the determination of the presence of the collision of the object with the vehicle when the deduced approach spot and the deduced impact spot are determined to match with each other,
wherein:
the vehicle includes an occupant protection apparatus that protects an occupant of the vehicle at the collision, the occupant protection apparatus being activated when the detection value of the impact sensor is equal to or greater than a threshold value;
when the detection value of the impact sensor is equal to or greater than the threshold value,
the collision determination section settles the determination of the presence of the collision based on only the detection value of the impact sensor, without further deducing the approach spot or the impact spot based on the detection values of the proximity sensors as well as the detection value of the impact sensor that detects the impact; and
when the detection value of the impact sensor that detects the impact is less than the threshold value,
the collision determination section settles the determination of the presence of the collision of the object with the vehicle by deducing the approach spot and the impact spot and then determining that the approach spot and the impact spot match with each other.

8. The vehicle information recording apparatus according to claim 7, wherein
the information management section further records position information on the approach spot in addition to the collision data when the collision determination section settles the determination of the presence of the collision of the object with the vehicle.

9. The vehicle information recording apparatus according to claim 7, wherein
the collision determination section calculates at least one of (i) a distance of the object to the vehicle or (ii) an approach speed of the object to the vehicle, using the detection value of the proximity sensor.

10. The vehicle information recording apparatus according to claim 7, wherein
the deduced approach spot and the deduced impact spot are determined to match with each other based on a predetermined ratio of overlap between a range of the deduced approach spot and a range of the deduced impact spot.

11. The vehicle information recording apparatus according to claim 7, wherein:
the plurality of proximity sensors are separately disposed at a front portion, a left portion, a rear portion, and a right portion of the vehicle to detect an object in an area surrounding the vehicle; and
the plurality of impact sensors are separately disposed at a front portion, a left portion, a rear portion, and a right portion of the vehicle to detect an impact applied from the area surrounding the vehicle to the vehicle.

* * * * *